US008049735B2

(12) United States Patent
Lee et al.

(10) Patent No.: US 8,049,735 B2
(45) Date of Patent: Nov. 1, 2011

(54) TOUCH PANEL (75) Inventors: Hsin-Hung Lee, Hsin-Chu (TW);
Po-Yuan Liu, Hsin-Chu (TW);
Ching-Huan Lin, Hsin-Chu (TW);
Min-Feng Chiang, Hsin-Chu (TW);
Mei-Sheng Ma, Hsin-Chu (TW)

(73) Assignee: AU Optronics Corp., Science-Based Industrial Park, Hsin-Chu (TW)

(*) Notice: Subject to any disclaimer, the term of this patent is extended or adjusted under 35 U.S.C. 154(b) by 854 days.

(21) Appl. No.: 12/104,447

(22) Filed: Apr. 17, 2008

(65) Prior Publication Data
US 2009/0058826 A1 Mar. 5, 2009

(30) Foreign Application Priority Data

Sep. 4, 2007 (TW) .............................. 96132881 A (51) Int. Cl.
*G06F 3/041* (2006.01)
(52) U.S. Cl. .................. 345/173; 345/174; 178/18.05; 349/155
(58) Field of Classification Search .................. 345/173, 345/174; 178/18.03, 18.05; 349/12, 155–157, 349/160
See application file for complete search history.

(56) References Cited

U.S. PATENT DOCUMENTS

| 6,501,529 B1 * | 12/2002 | Kurihara et al. | 349/160 |
| 6,611,242 B1 * | 8/2003 | Hongo et al. | 345/2.1 |
| 7,133,108 B2 * | 11/2006 | Shimizu et al. | 349/155 |
| 7,166,920 B2 | 1/2007 | Saito et al. | |
| 7,609,357 B2 * | 10/2009 | Kim | 349/156 |
| 7,675,580 B2 * | 3/2010 | Rho | 349/12 |
| 7,825,998 B2 * | 11/2010 | Chen et al. | 349/12 |
| 2003/0048403 A1 * | 3/2003 | Satoh | 349/156 |
| 2004/0114087 A1 * | 6/2004 | Cho et al. | 349/155 |
| 2005/0185129 A1 * | 8/2005 | Kim et al. | 349/156 |
| 2005/0190338 A1 * | 9/2005 | Lim | 349/156 |
| 2005/0237470 A1 * | 10/2005 | Kadotani | 349/155 |
| 2006/0012575 A1 * | 1/2006 | Knapp et al. | 345/173 |
| 2006/0017710 A1 | 1/2006 | Lee | |
| 2006/0109222 A1 * | 5/2006 | Lee et al. | 345/88 |
| 2006/0203177 A1 * | 9/2006 | Cho et al. | 349/155 |
| 2006/0203178 A1 * | 9/2006 | Cho et al. | 349/156 |
| 2007/0002264 A1 * | 1/2007 | Kim | 349/156 |
| 2007/0040814 A1 | 2/2007 | Lee et al. | |
| 2007/0132937 A1 * | 6/2007 | Lee et al. | 349/156 |
| 2007/0139604 A1 * | 6/2007 | Paik et al. | 349/156 |
| 2007/0170949 A1 * | 7/2007 | Pak et al. | 324/770 |
| 2007/0188697 A1 * | 8/2007 | Oh et al. | 349/156 |

FOREIGN PATENT DOCUMENTS

| JP | 2005267464 | 9/2005 |
| TW | 200409033 | 6/2004 |
| TW | M255422 | 1/2005 |
| TW | 200612139 | 4/2006 |

* cited by examiner

*Primary Examiner* — Amare Mengistu
*Assistant Examiner* — Dmitriy Bolotin
(74) *Attorney, Agent, or Firm* — Winston Hsu; Scott Margo (57) ABSTRACT

A touch panel has a first substrate and a second substrate. The thickness in the non-sensor regions of the first substrate is greater than the thickness in the sensor regions of the first substrate. The second substrate includes first photo spacers and second photo spacers having substantially the same heights. The first photo spacers are structurally connected to the non-sensor regions of the first region of the first substrate, and the second photo spacers are positioned corresponding to the sensor regions of the first substrate that maintain a first gap with the first substrate.

15 Claims, 10 Drawing Sheets

TOUCH PANEL

BACKGROUND OF THE INVENTION

1. Field of the Invention

The present invention is related to a touch panel, and particularly, to a touch liquid crystal display panel.

2. Description of the Prior Art

Portable electronic devices such as PDAs, mobile phones, global positioning systems (GPS), and digital video players generally use a touch panel as the communicating interface between a user and the machine. Modern consumer electronic devices are increasingly smaller and lighter. In order to save space, a touch panel, which inputs data when it is touched, is the key component of modern consumer electronic devices, replacing traditional input devices, such as keyboards and mouse.

Figure 1:
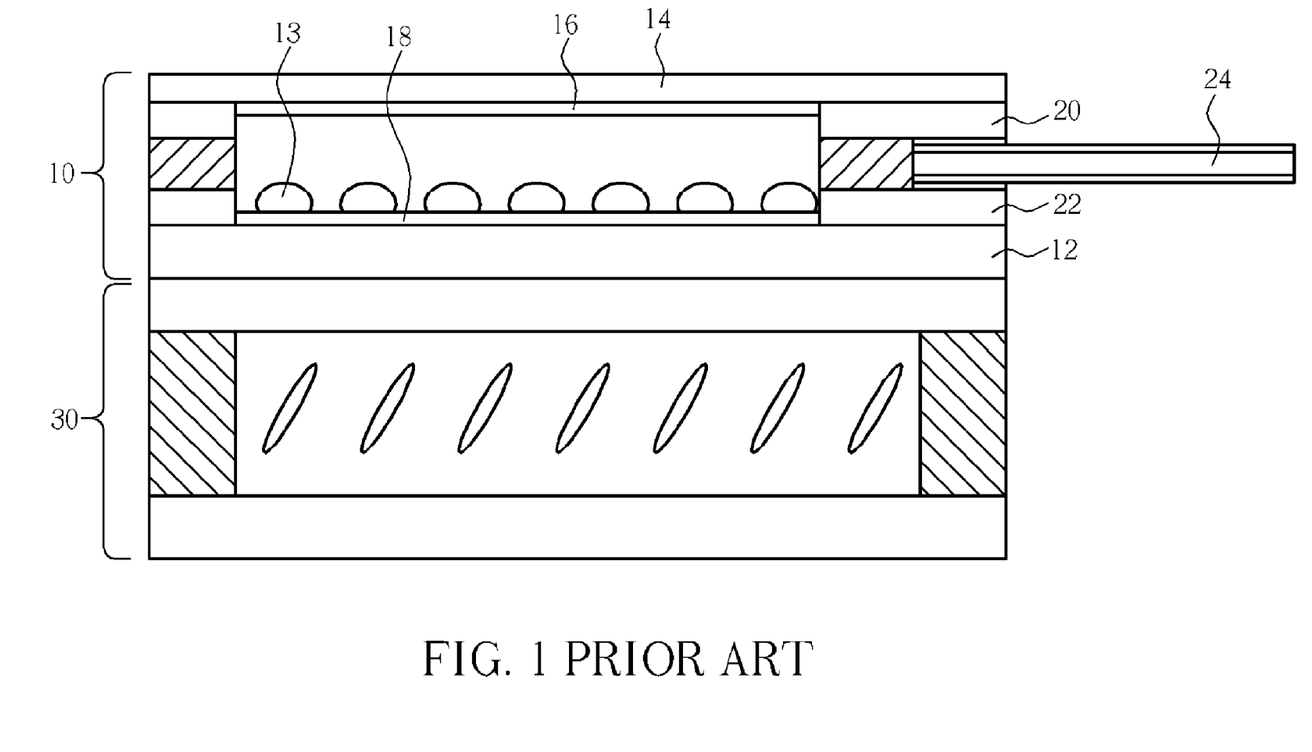
FIG. 1 is a schematic diagram showing a conventional touch panel.

Please refer to FIG. 1, which is a schematic diagram showing a conventional touch panel. The conventional touch panel 10 is placed on a display side of a display panel 30. The touch panel 10 has a conductive glass substrate 12, a conductive thin film 14 disposed on the conductive glass substrate 12, and a plurality of spacers 13 positioned between the conductive glass substrate 12 and the conductive thin film 14. A top transparent conductive layer 16 and a bottom transparent conductive layer 18 are respectively positioned on a surface of the conductive glass substrate 12 and a surface of the conductive thin film 14 facing each other. The top transparent conductive layer 16 is electrically connected to a conductive trace 20, and the bottom transparent conductive layer 18 is electrically connected to another conductive trace 22. In addition, the conductive traces 20, 22 are electrically connected to a flexible printed circuit (FPC) 24. The conventional touch panel 10 is a resistance type touch panel, which senses a signal according to a voltage variation. When a finger touches the conductive thin film 14 of the touch panel 10, a voltage variation is induced at the touch point. The position of the touch point may be calculated by the value of the voltage variation, and the input signal representing the touch point is sent out through the bottom transparent conductive layer 16, the conductive trace 22, and the FPC 24.

The above-mentioned conventional touch panel 10 is disposed on the display side of the display panel 30 through an external attachment. The addition of the conventional touch panel 10 increases the thickness of the display panel 30 and reduces the light transmitting rate. Therefore, the brightness of the display panel is reduced. In addition, the conventional touch panel 10 only supports a single touch input, which means only one point may be used for an input at any one time. A multi-touch input is not allowable, which restricts the application of the conventional touch panel.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

It is therefore a primary objective of the present invention to provide a touch panel of simplified structure and capable of supporting multi-touch input.

According to the present invention, a touch panel of the present invention is disclosed. The touch panel comprises a first substrate and a second substrate. The first substrate includes a plurality of sensor regions and a plurality of non-sensor regions. The non-sensor regions of the first substrate have a first thickness, and the sensor regions of the first substrate have a second thickness, in which the first thickness is greater than the second thickness and results in a thickness difference. The second substrate is disposed facing the first substrate, and comprises a plurality of first photo spacers and a plurality of second photo spacers disposed on the second substrate facing the first substrate. The first photo spacer and the second photo spacer have substantially the same height. In addition, the first photo spacers are structurally connected to the non-sensor regions of the first substrate. The second photo spacers are positioned corresponding to the sensor regions of the first substrate, and the second photo spacers and the first substrate are positioned with a first gap.

According to the present invention, another touch panel of the present invention is disclosed. The touch panel comprises a first substrate, a second substrate, and a liquid crystal layer disposed between the first substrate and the second substrate. The first substrate includes a plurality of sensor regions and a plurality of non-sensor regions. The non-sensor regions of the first substrate have a first thickness, and the sensor regions of the first substrate have a second thickness, in which the first thickness is greater than the second thickness and results in a thickness difference. The second substrate is disposed facing the first substrate, and comprises a plurality of first photo spacers and a plurality of second photo spacers disposed on the second substrate facing the first substrate. The first photo spacer and the second photo spacer have substantially the same height. In addition, the first photo spacers are structurally connected to the non-sensor regions of the first substrate, and the second photo spacers are positioned corresponding to the sensor regions of the first substrate with a first gap.

According to the present invention, a touch panel of the present invention is further disclosed. The touch panel comprises a first substrate and a second substrate. The first substrate includes a plurality of sensor regions and a plurality of non-sensor regions. The non-sensor regions of the first substrate have a first thickness, and the sensor regions of the first substrate have a second thickness, in which the first thickness is greater than the second thickness and results in a thickness difference. The second substrate is disposed facing the first substrate, and comprises a plurality of first photo spacers, a plurality of second photo spacers, and a plurality of third photo spacers disposed on the second substrate facing the first substrate. The first photo spacer, the second photo spacer, and the third photo spacers have substantially the same height. The first photo spacers are structurally connected to the non-sensor regions of the first substrate. The second photo spacers and the first substrate are positioned in a first gap, and the third photo spacers and the first substrate are positioned in a second substrate. In addition, the second gap can be less than the first gap.

According to the above, the touch panel of the present invention has photo spacers made of substantially the same height, and the first substrate has different thicknesses in the sensor regions and the non-sensor regions by means of changing the pattern of the mask for each thin film. Therefore, the touch panel is formed without additional manufacturing processes. In addition, the touch panel of the present invention has a switch disposed on each sensor region for multi-touch input.

These and other objectives of the present invention will no doubt become obvious to those of ordinary skill in the art after

DETAILED DESCRIPTION

Hereinafter, preferred embodiments of the present invention will be described with reference to the accompanying drawings, in which components with substantially the same functions are identified by the same reference numeral for the sake of simplicity. It should be noted, however, that the present invention is in no way limited to the following illustrative embodiments.

Figure 2:
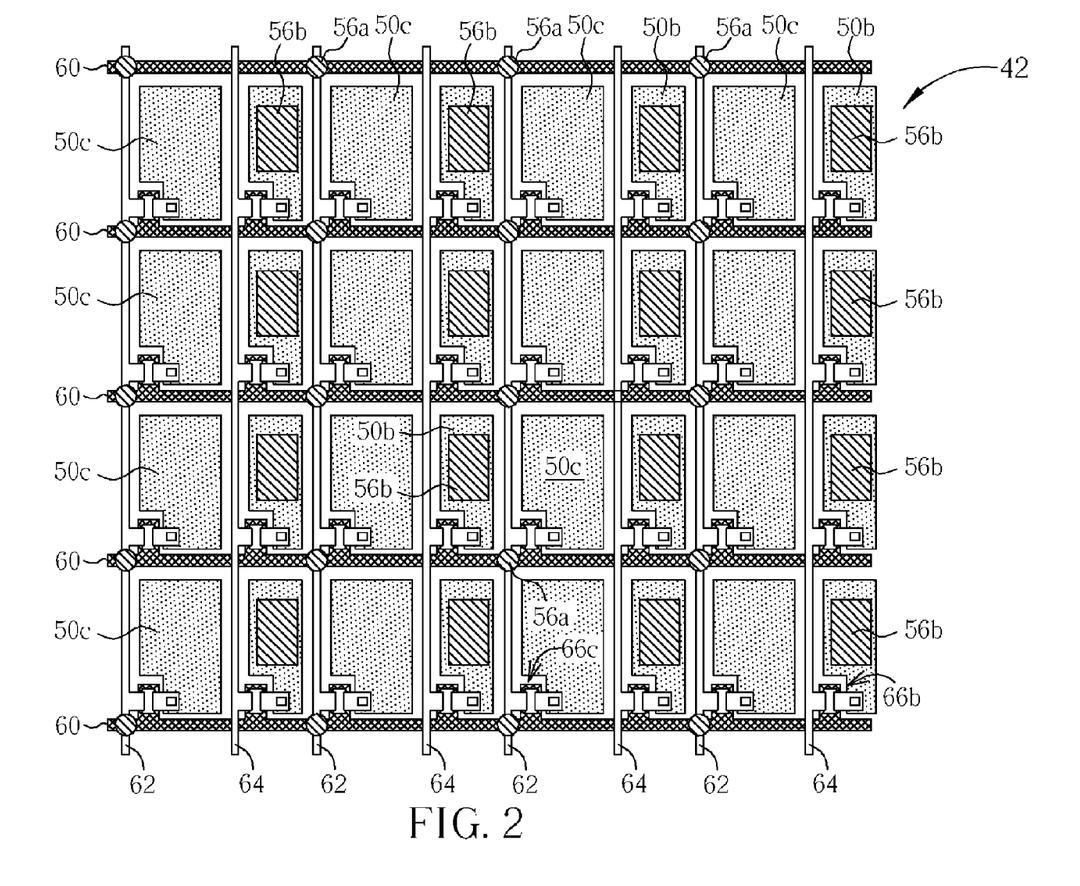
FIGS. 2-3 are schematic diagrams illustrating a touch panel according to a preferred embodiment of the present invention.
Figure 3:
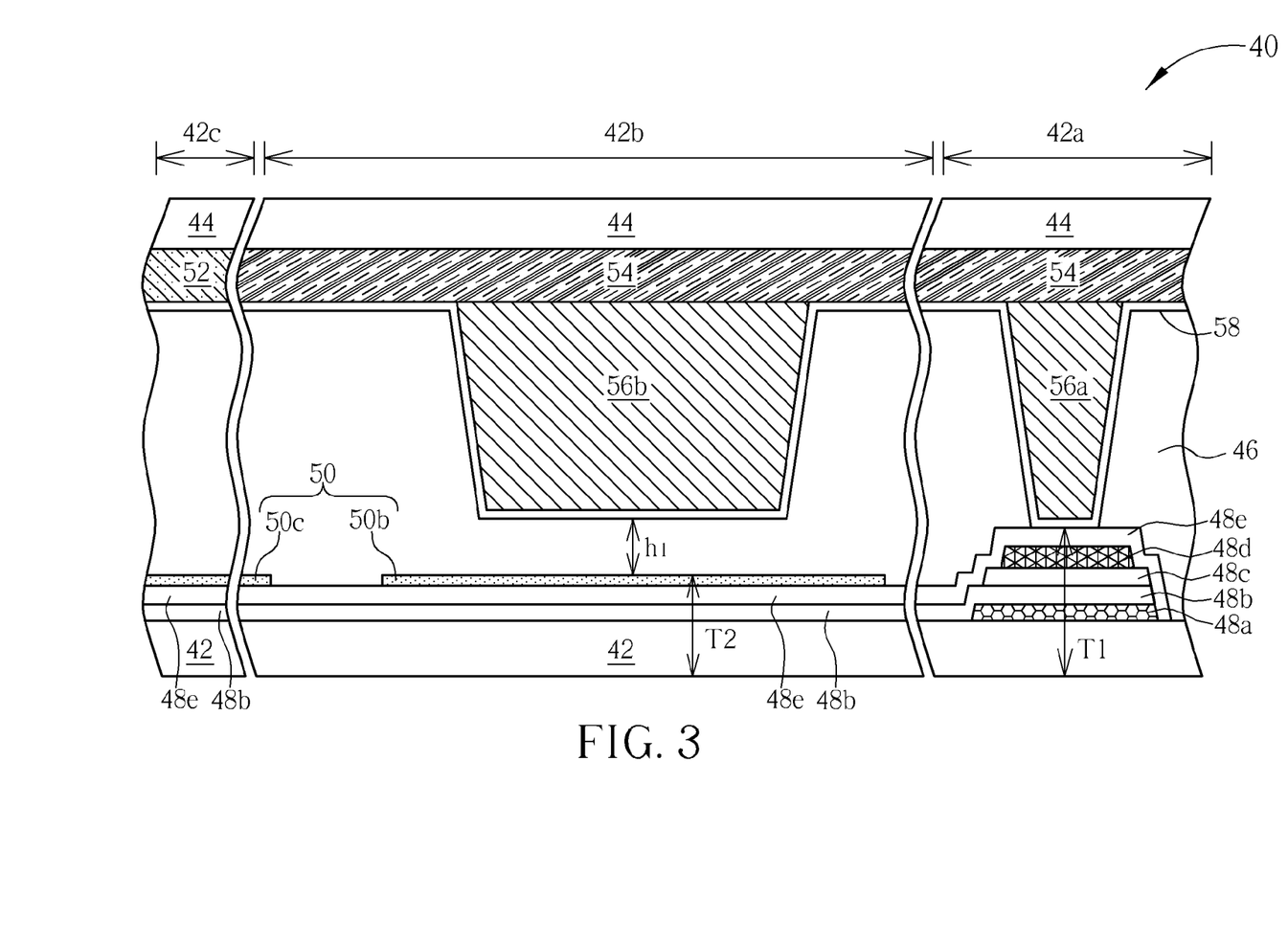

Please refer to FIG. 2 and FIG. 3, which are schematic diagrams illustrating a touch panel according to a preferred embodiment of the present invention. This embodiment takes a touch liquid crystal panel as an example, but other devices having a touch panel therein are allowable. The touch panel may work independently or be incorporated into other types of display panels. In order to emphasize the characteristics of the present invention, FIG. 2 only shows partial components of the touch panel from the top view, and FIG. 3 shows the cross-section of the touch panel. Referring to FIG. 2 and FIG. 3, the touch panel 40 of the present invention includes a first substrate (an array substrate) 42, a second substrate (a color filter substrate) 44, and a liquid crystal layer 46 disposed between the first substrate 42 and the second substrate 44. The first substrate 42 is a transparent substrate, such as a glass substrate, or a quartz substrate. A plurality of thin films are formed on the first substrate 42, for example, a first metal layer, a semiconductor layer, an isolation layer of polysilicon or amorphous silicon, a dielectric layer, a second metal layer, a passivation layer, and a transparent conductive layer that form the essential components of the liquid crystal display panel, such as scan lines, data lines, thin film transistors, pixels and capacitors. The first substrate 42 also includes a plurality of non-sensor regions 42a, a plurality of sensor regions 42b, and a plurality of display regions 42c. According to the present embodiment, the first substrate 42 has a first thickness T1 in the non-sensor regions 42, and has a second thickness T2 in the sensor regions 42b, in which the first thickness T1 is greater than the second thickness T2. In addition, a thickness difference or a thickness variation is determined by total thickness of the thin films in the non-sensor regions 42a of the first substrate 42 in contrast with total thickness of the thin films in the sensor region 42b of the first substrate 42. In the present embodiment, a gate electrode (the first metal layer) 48a, a gate isolation layer 48b, a semiconductor layer 48c, a source/drain layer (the second metal layer) 48d, a passivation layer 48e, and a first conductive layer (the transparent layer) 50 are subsequently disposed on the non-sensor regions 42b of the first substrate 42. On the other hand, a gate isolation layer 48b, a passivation layer 48e, and a first conductive layer (the transparent layer) 50 are subsequently disposed on the sensor regions 42b of the first substrate 42. Therefore, the thickness difference between the first thickness T1 and the second thickness T2 is obtained by the total thickness of the gate electrode 48a, the semiconductor layer 48b, and the source/drain gate layer 48d and by minus the thickness of the first conductive pattern 50b. Referring to FIG. 3, a flat structure is formed in each sensor region 42b of the first substrate 42, and a bump structure is formed in each non-sensor region 42b of the first substrate 42. It should be noted that the thickness difference of the present embodiment is determined by means of forming the gate electrode 48a, the gate isolation layer 48b, the semiconductor layer 48c, the source/drain layer 48d, and the passivation layer 48e and forming the gate isolation layer 48b, the passivation layer 48e, and the first conductive layer 50 that results in the thickness difference between the non-sensor region 42a and the sensor region 42b. However, the thickness difference may be determined by other mechanisms, such as modifying the position of the thin films, or selecting different thin films from the above-mentioned thin films of the embodiment.

The second substrate 44 may also be a transparent substrate and has a color filter layer 52, a black matrix 54, a plurality of first photo spacers 56a, a plurality of second photo spacers 56b, and a second conductive layer 58. The first photo spacers 56a and the second photo spacers 56b are made of flexible materials. In the present embodiment, the color filter layer 52 is positioned corresponding to the display region 42c, and the black matrix 54 is positioned corresponding to the sensor region 42b and non-sensor region 42a. The second conductive layer 58 is formed on a surface of the color filter layer 52, the black matrix 54, and the second photo spacer 56b. The second conductive layer 58 is a transparent conductive layer and performs as a common electrode of the liquid crystal display panel. It is considerable that the second conductive layer 58 of the present embodiment may also disposed on a surface of the first photo spacers 56a, but is not limited to this arrangement. The second conductive layer 58 may be formed without covering the surface of the first photo spacers 56a in other preferred embodiments.

The first photo space 56a and the second photo space 56b are disposed on a side or a surface of the second substrate 44 facing the first substrate 42 and have substantially the same height for improving accuracy of the spacers, reducing height error, and simplifying manufacturing processes. The first photo spacers 56a are positioned corresponding to the non-sensor regions 42a. The second photo spacers 56b are positioned corresponding to the sensor regions 42b. The first substrate 42 has the first thickness T1 in the non-sensor regions 42a, and the first thickness T1 is greater than the second thickness T2 in the sensor region 42b of the first substrate 42. The first photo spacers 56a are structurally connected to the respective non-sensor regions 42a. Meanwhile, the second photo spacers 56b in the sensor regions 42b have no contact with the first substrate 42, and keep a first gap $h_1$ between each other.

The first conductive layer 50 of the present invention has a plurality of first conductive patterns 50b disposed in a respective sensor region 42b. The first conductive pattern 50b and the pixel electrode 50c are formed by defining the same transparent conductive layer. Each first conductive pattern 50b and its corresponding second conductive layer 58 forms a sensor. In addition, touch panel 40 further has a plurality of scan lines 60 arranged in a first direction (in horizontal direction shown in FIG. 2), a plurality of data lines 62 arranged in a second direction (in vertical direction shown in FIG. 2), and a plurality of signal reading lines 64 arranged along the second direction. A display region 42c is defined by a boundary of two neighboring scan lines 60 and two neighboring data lines 62. A sensor region 42b is defined by a boundary of two neighboring scan lines 60 and two neighboring signal reading lines 64. The non-sensor regions 42 are positioned around the sensor region 42b. Each display region 42c has a switch (thin film transistor, TFT) 66c, which has a gate electrically connected to the scan line 60 and a source electrically connected to the data line 62 to control the display region 42c. The signal reading line 64 is capable of reading the signal detected by the sensor; for example, signals induced by changes of capacitance between the first conductive pattern 50b of the first conductive layer 50 and the second conductive layer 58, or signals induced by contacts between the first conductive pattern 50b of the conductive layer 50 and the second conductive layer 50.

In the present embodiment, the first substrate 42 has the first thickness T1 in the non-sensor regions 42a and the first thickness T1 is greater than the second thickness T2 in the sensor regions 42b. The first photo spacers 56a of the second substrate 44 have substantially the same height as the second photo spacers 56b. In addition, the first photo spacers 56a are structurally connected to the non-sensor regions 42a of the first substrate 42. Normally, the first photo spacers 56a allow the first substrate 42 and the second substrate 44 to be positioned at a distance. In contrast, the second photo spacers 56b are isolated from the first substrate 42, and allow the first conductive pattern 50b of the first substrate 42 and the second conductive layer 58 of the second substrate 44 to maintain a constant capacitance.

Figure 4:
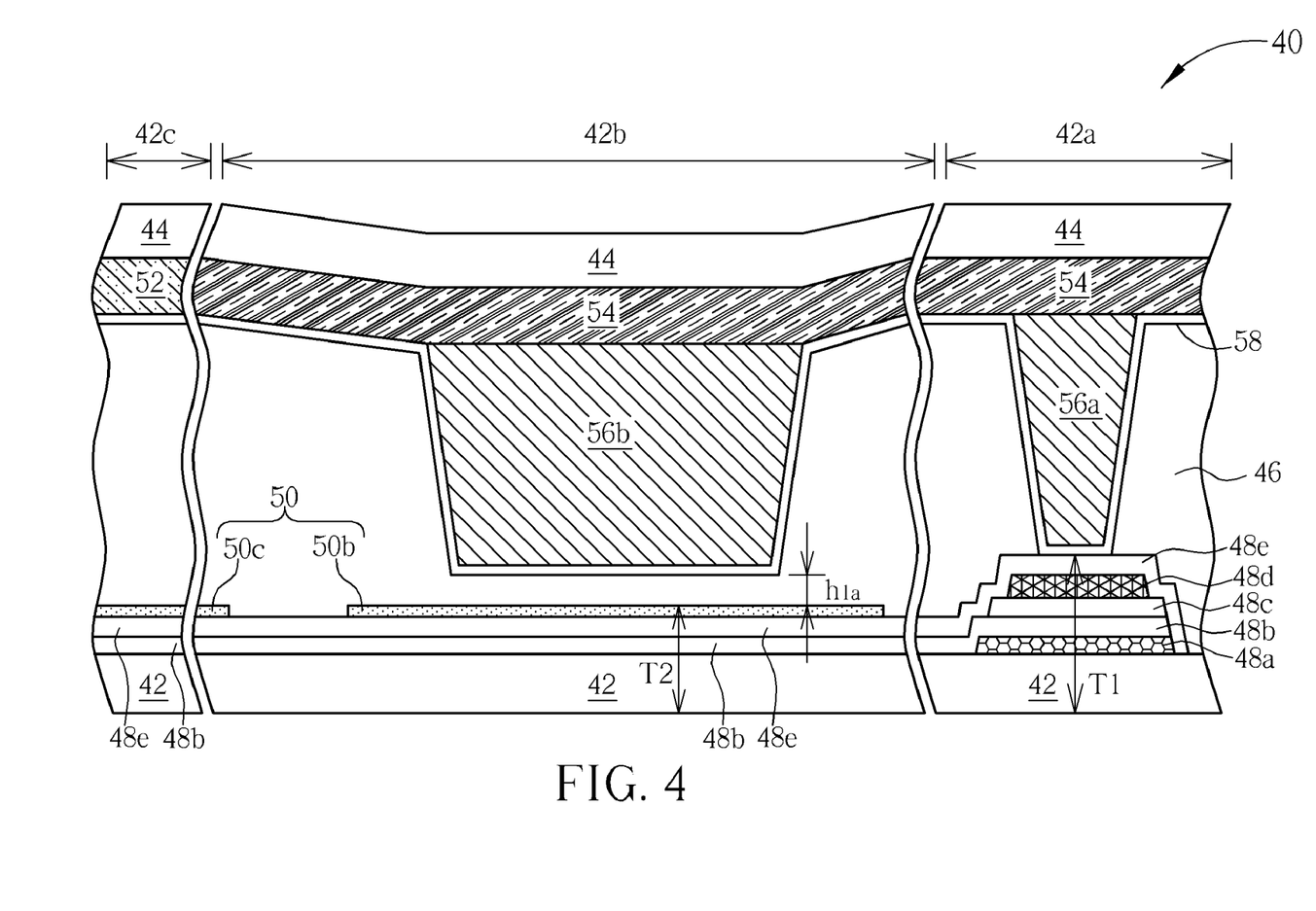
FIG. 4 is a schematic diagram illustrating the structure of the touch panel pressed by a finger or other implements.

Please refer to FIG. 4 for comparison with FIG. 3. FIG. 4 is a schematic diagram illustrating the structure of the touch panel pressed by a finger or other implements. As shown in FIG. 4, when a finger or an implement is touched on the surface (the display surface) of the second substrate 44 of the touch panel 50, a conformation change occurs at the touch point in the sensor region 42b of the first substrate 42. The first gap between the first substrate 42 and the second substrate 44 is reduced from $h_1$ to $h_{1a}$. With a powerful press, the second conductive layer 58 may even contact the corresponding first conductive pattern 50 at the touch point in the sensor region 42b. The change of the first gap $\Delta(h_1-h_{1a})$ induces a change of capacitance, which is detected by the sensor for inducing signals in response to the position of the touch point. The touch point may also be detected by analyzing the related current drops or voltage drops induced by contacts between the second conductive layer 58 and the corresponding first conductive pattern 50.

Figure 5:
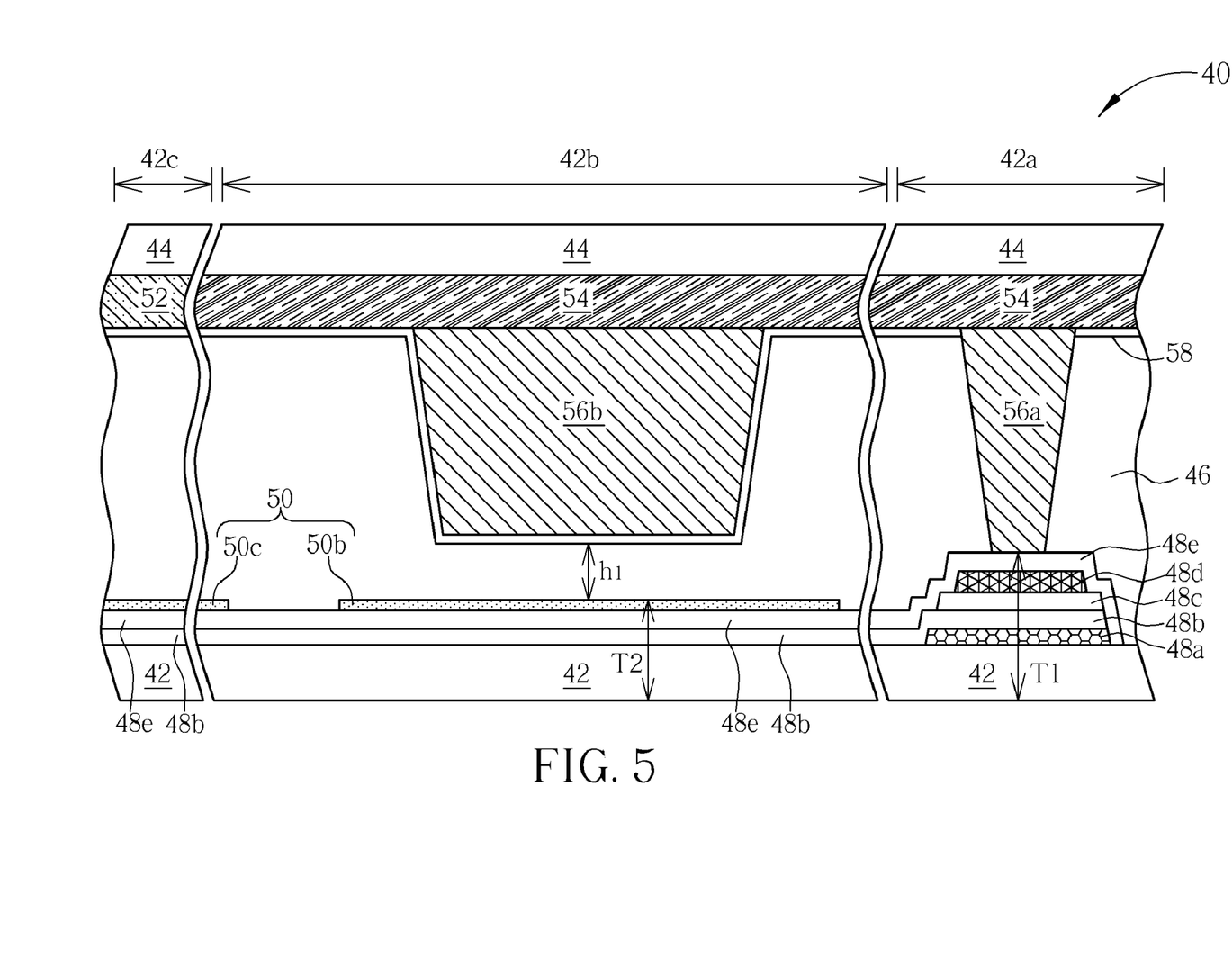
FIG. 5 is schematic diagram showing a touch panel according to another embodiment of the present invention.

In addition to the aforementioned embodiment, other preferred embodiments of the touch panel of the present invention are disclosed as follows. In order to show the differences between preferred embodiments, components with substantially the same functions are identified by the same reference numeral. The structure of these components is described above. The following only shows the differences between the embodiments. Referring to FIG. 5, FIG. 5 is a schematic diagram showing a touch panel according to another embodiment of the present invention. As shown in FIG. 5, the second conductive layer 58 is formed without covering the surface of the first photo spacers 56a. (The second conductive layer 58 of the aforementioned embodiment is disposed covering the surface of the first photo spacers 56a).

Figure 6:
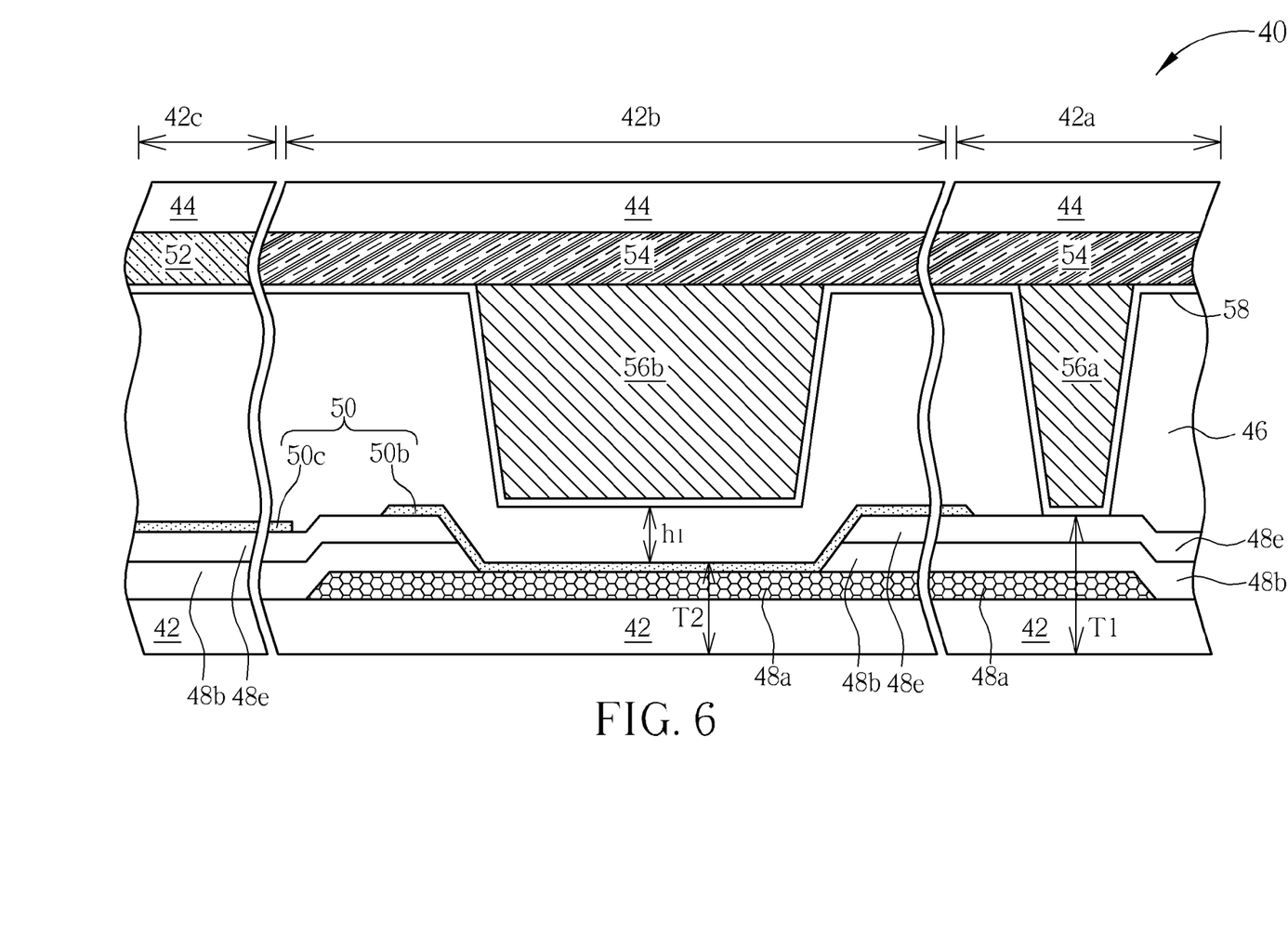
FIG. 6 is a schematic diagram of a touch panel according to a preferred embodiment of the present invention.

Referring to FIG. 6, FIG. 6 further discloses a schematic diagram of a touch panel according to a preferred embodiment of the present invention. As shown in FIG. 6, a gate electrode 48a, a gate isolation layer 48b and a passivation layer 48e are formed in the non-sensor region 42a of the first substrate 42. A gate electrode 48a and a first conductive pattern 50b are formed in the sensor region 42b of the first substrate 42. Consequently, the first thickness T1 in the non-sensor region 42a is also greater than the second thickness T2 in the sensor region 42b. The thickness difference between the first thickness T1 and the second thickness T2 is determined by a total thickness of the gate isolation layer 48b and the passivation layer 48e minus the thickness of the first conductive pattern 50b. Furthermore, the first substrate 42 has a flat structure in each non-sensor regions 42a, and has a recess structure in each sensor region 42b.

The first photo spacers 56a and the second photo spacers 56b have substantially the same height. Hence, the first photo spacers 56 are structurally connected to a respective non-sensor region 42a of the first substrate. The second photo spacers 56b, which are positioned corresponding to the sensor region 42b, and the first substrate 42 are positioned with a first gap $h_1$, so that a sensor is formed between each of the first conductive pattern 50b and the second conductive layer 58.

Figure 7:
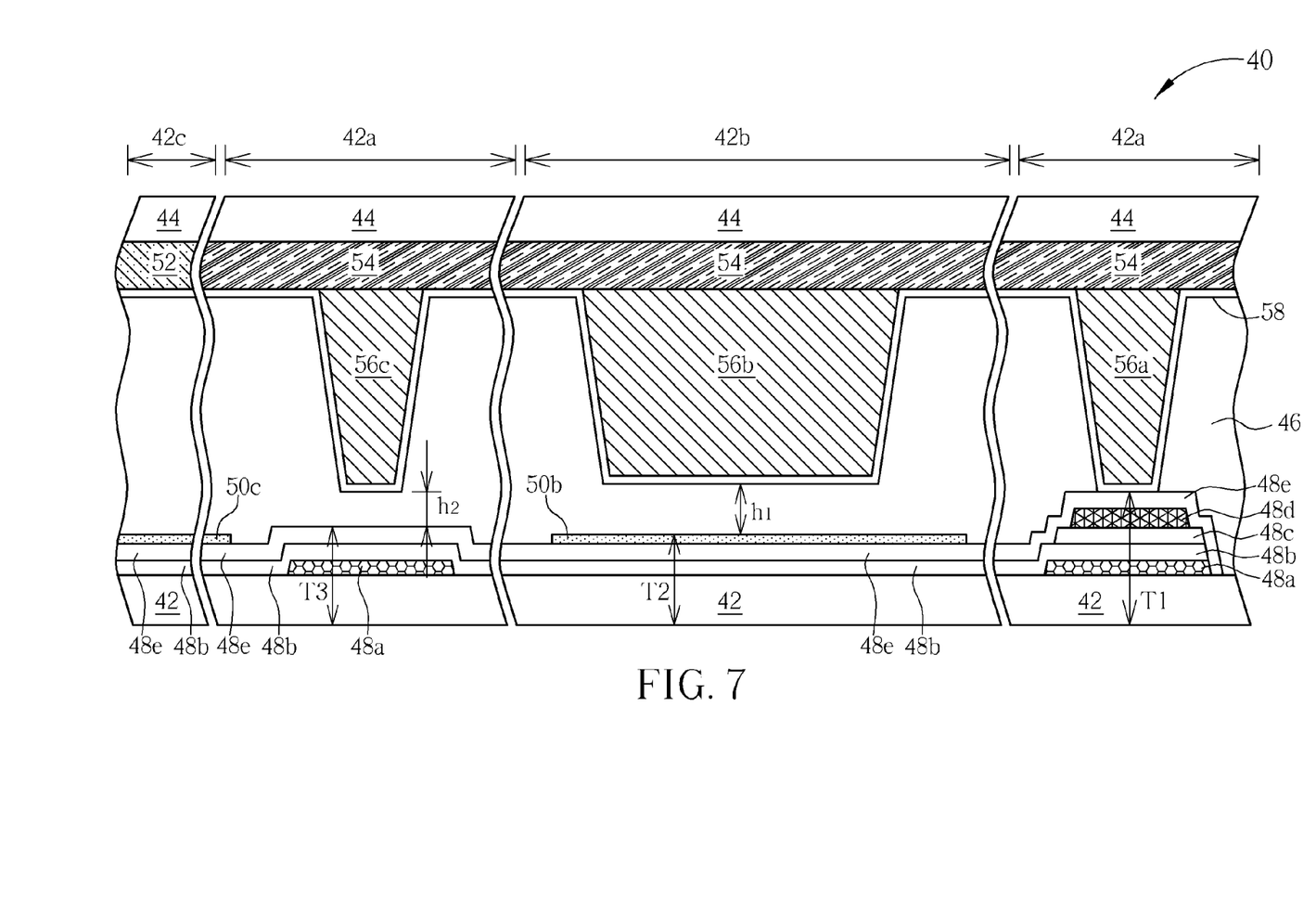
FIG. 7 and FIG. 8 are schematic diagrams of a touch panel according to another preferred embodiment of the present invention.
Figure 8:
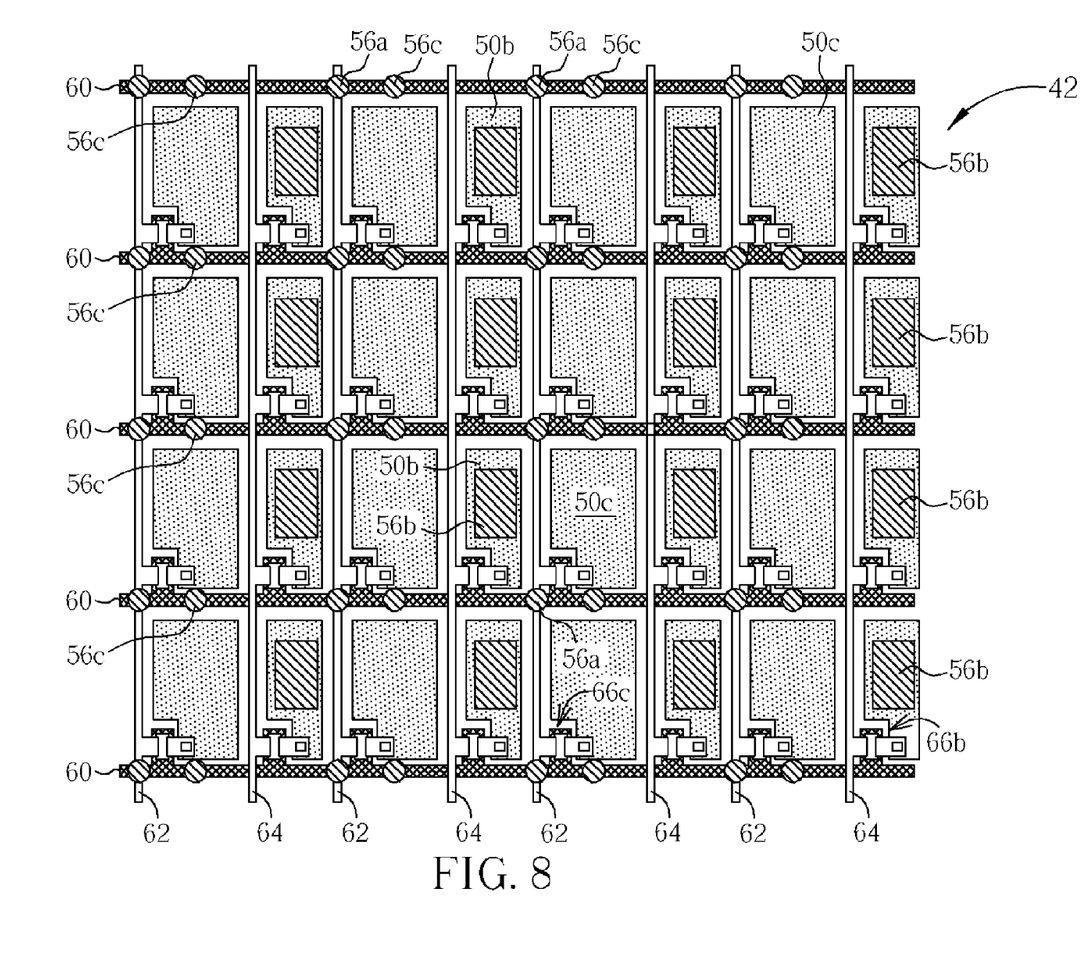

Referring to FIG. 7 and FIG. 8, FIG. 7 and FIG. 8 are schematic diagrams of a touch panel according to another preferred embodiment of the present invention. FIG. 7 is a vertical diagram of the touch panel. FIG. 8 is a top-view diagram showing portion components of the touch panel. As shown in FIG. 7 and FIG. 8, in addition to the first photo spacers 56a and the second photo spacers 56b, the second substrate 44 of the touch panel of the present invention further has a plurality of third photo spacers 56c positioned corresponding to the non-sensor region 42a of the first substrate 42. The first photo spacers 56a, the second photo spacers 56b and the third photo spacers 56c disposed on a side or a surface of the second substrate 44 facing the first substrate 42 and have substantially the same height and are preferably made of flexible materials. The second conductive layer 58 is covered on the surface of the second photo spacers 56b. The surface of the first photo spacers 56a and the third photo spacers 56c may be covered with/without the second conductive layer 58.

Moreover, in addition to the first thickness T1 in the non-sensor regions 42a, the first substrate 42 further has a third thickness T3 positioned corresponding to the third photo spacers 56c. The third thickness T3 has a thickness between the first thickness T1 and the second thickness T2. In the present embodiment, a gate electrode 48a, a gate isolation layer 48b, a semiconductor layer 48c, a source/drain layer 48d, a passivation layer 48e, and a first conductive layer 50 are disposed corresponding to the first photo spacers 56a on the first substrate 42. A gate isolation layer 48b, a passivation layer 48e, and a first conductive layer 50 are subsequently disposed corresponding to the second photo spacers 56b in the sensor regions 42b of the first substrate 42. A gate electrode 48a, a gate isolation layer 48b, and a passivation layer 48e are subsequently disposed corresponding to the third photo spacers 56c on the non-sensor regions 42a of the first substrate 42. The thickness of the first substrate 42 is variable. For example, the first substrate 42 has the greatest thickness positioned corresponding to the first photo spacers 56a, and has the least thickness positioned corresponding to the second photo spacers 56b. When the first substrate 42 and the second substrate 44 are combined, the first photo spacers 56a are structurally connected to the first substrate. The second photo spacers 56b and the first substrate 42 are positioned with a first gap $h_1$. The third photo spacers 56c and the first substrate 42 are positioned in a second gap $h_2$. The second gap $h_2$ is shorter than the first gap $h_1$ ($h_2 < h_1$). As described above, a conformation change occurs when the second substrate 44 is pressed. It induces a change of capacitance. However, if someone presses the second substrate 44 with too much pressure, the conformation change of the second substrate leads to damages of the touch panel 40. For this reason, the third photo spacers 56c act as a buffer and physically supports the touch panel 40. When user press the touch panel 40 with a stronger pressure, the third photo spacers 56c attaches the first substrate 42 and maintain the structure of the touch panel 40 with a supporting strength. At that time, the pressure is strong enough to make a conformation change of the second substrate 44 at the touch point to induce changes of capacitance that are detected by the sensor.

Figure 9:
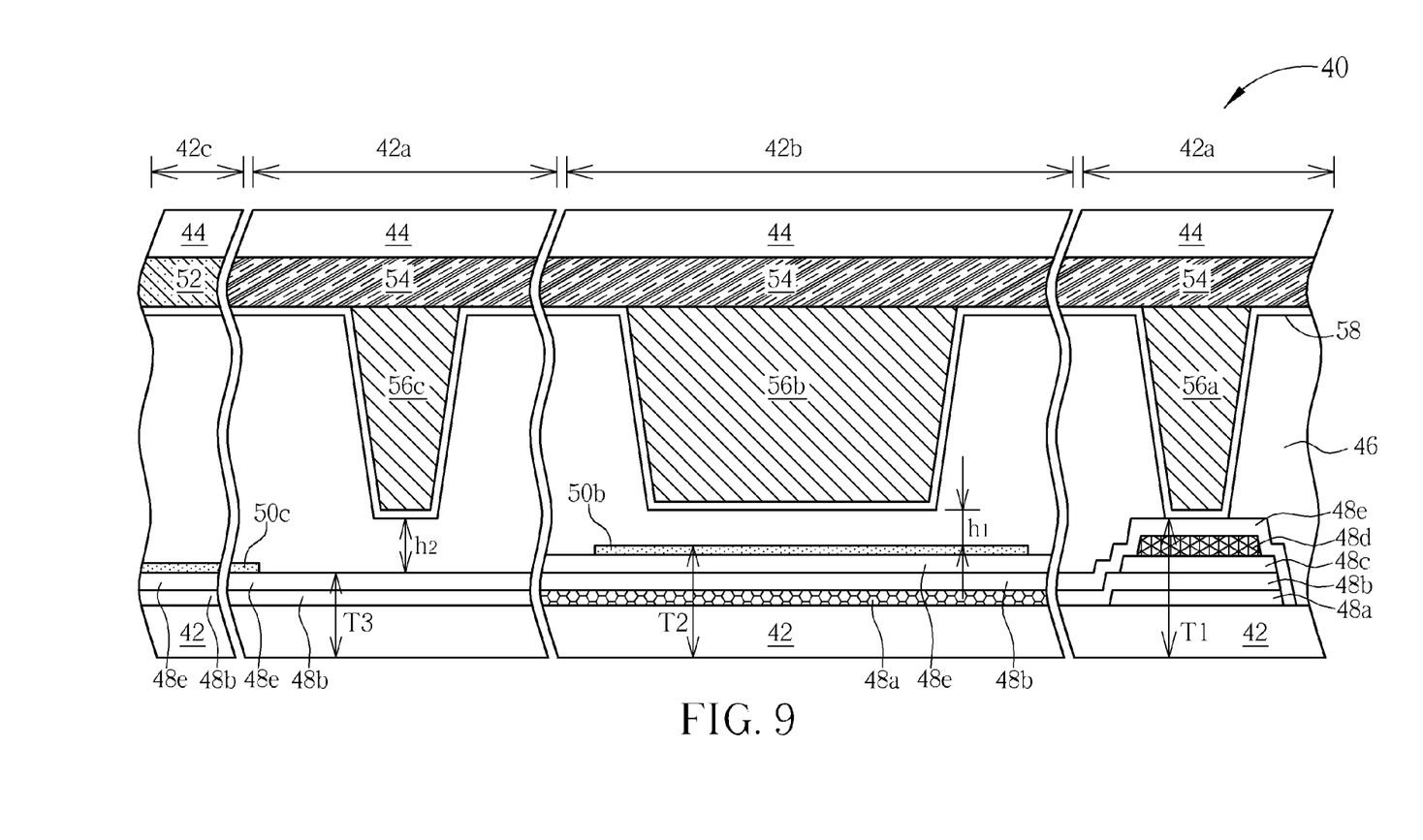
FIG. 9 is a schematic diagram illustrating a touch panel according to another preferred embodiment of the present invention.

Please refer to FIG. 9, which is a schematic diagram illustrating a touch panel according to another preferred embodiment of the present invention. Compared to FIG. 7, the touch panel of the present embodiment is a contact touch panel (such as a resistance type touch panel). The third thickness T3 of the first substrate 42, which is positioned corresponding to the third photo spacers 56c, is less than the second thickness T2, which is positioned corresponding to the second photo spacers 56b. In contrast, the first thickness T1 is the greatest (greater than the second thickness T2 or the third thickness T3). Therefore, the first gap $h_1$ between the second photo spacers 56b and the first substrate 42 is less than the second gap $h_2$ between the third photo spacers 56 and the first substrate 42 ($h_2 < h_1$). By means of pressing the second substrate 44, a conformation change occurs that leads the second conductive layer 58, which is positioned on the second photo spacers 56b, to be attached to the first conductive pattern 50b. Meanwhile, the third photo spacers 56c act as a buffer and prevent the second substrate 44 or other components from damage resulting from excess conformation change.

According to the preferred embodiments of the present invention, the first photo spacers 56a, the second photo spacers 56b, and the third photo spacers 56c are formed by the same lithography process. No extra process is required for forming these photo spacers. The pattern of the photo spacers may be modified depending on the strength of the structure or the design of the sensors, and is not limited to those shown in aforementioned embodiments.

Figure 10:
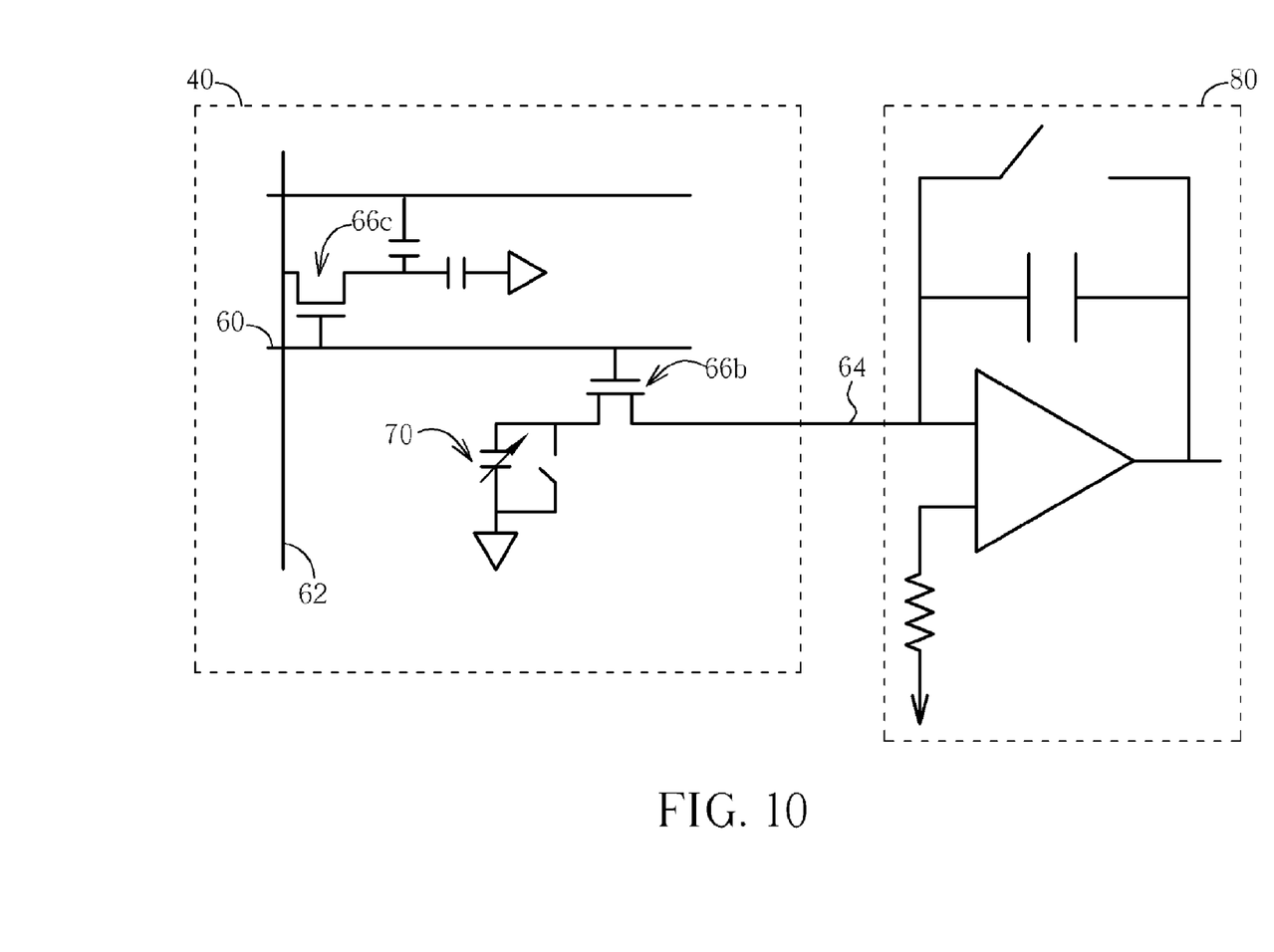
FIG. 10 is a schematic diagram illustrating an electrical circuit of the touch panel according to a preferred embodiment of the present invention.

Please refer to FIG. 10 while referring to FIG. 2 and FIG. 8. FIG. 10 is a schematic diagram illustrating an electrical circuit of the touch panel according to a preferred embodiment of the present invention. As shown in FIG. 10, a varactor 70 is formed by the first conductive pattern 50b and the second conductive layer 58 in each sensor region 42b. When a sensor region 42b is pressed, a change of capacitance of the varactor 70 generates a signal resulting from the touch input. The signal is transmitted to an analysis circuit 80. It is appreciated that the pattern of the electrical circuit is not limited to those shown in FIG. 10, and other patterns suitable for the touch panel of the present invention are allowable. For instance, another electrical circuit may be provided for the resistance type touch panel shown in FIG. 9.

As described above, the touch panel of the present invention has photo spacers made of substantially the same height. By means of constructing different thickness in the sensor regions and the non-sensor regions of the first substrate (which is formed by modifying an original pattern of the mask for the thin films), a touch panel is formed without additional manufacturing processes. Furthermore, the touch panel of the present invention has switches disposed in each sensor region for supporting multi-touch input and overcoming the disadvantage of single touch input performed by a conventional touch panel.

According to the aforementioned embodiments, the touch panel of the present invention has a simple structure and is formed with existing manufacturing processes. The sensors of the touch panel of the present invention are formed by means of modifying the thickness of the thin film disposed on the liquid crystal display panel. Therefore, the unity of the sensors is improved without extra cost.

Those skilled in the art will readily observe that numerous modifications and alterations of the device and method may be made while retaining the teachings of the invention.

What is claimed is:

1. A touch panel, comprising:
   a first substrate comprising a plurality of sensor regions and a plurality of non-sensor region, the non-sensor region having a plurality of first regions and a plurality of second regions, the first substrate in the first regions of the non-sensor regions having a first thickness, the first substrate in the sensor regions having a second thickness, the first substrate in the second regions of the non-sensor regions having a third thickness, wherein the first thickness is greater than the second thickness, and the second thickness is greater than the third thickness; and
   a second substrate disposed facing the first substrate, the second substrate comprising a plurality of first photo spacers, a plurality of second photo spacers and a plurality of third photo spacers disposed on the second substrate facing the first substrate, the first photo spacers, the second photo spacers and the third photo spacers having substantially the same height, the first photo spacers being structurally connected to the first substrate in the first regions of the non-sensor regions, the second photo spacers being positioned corresponding to the first substrate in the sensor regions to form a first gap between the second photo spacer and the first substrate in the sensor region, the third photo spacers being positioned corresponding to the first substrate in the second region of the non-sensor regions to form a second gap between the third photo spacer and the first substrate in the second region of the non-sensor region, wherein the second gap is larger than the first gap.

2. The touch panel of claim 1, wherein the touch panel comprises a touch liquid crystal display panel.

3. The touch panel of claim 2, wherein the first substrate comprises an array substrate, and the second substrate comprises a color filter substrate.

4. The touch panel of claim 3, wherein the touch panel further comprises a liquid crystal layer disposed between the array substrate and the color filter substrate.

5. The touch panel of claim 1, wherein a thickness difference between the first thickness and the second thickness is determined by a bump structure disposed in the first regions of the non-sensor region in contrast with the sensor regions.

6. The touch panel of claim 1, wherein a thickness difference between the second thickness and the third thickness is determined by a recess structure disposed in the second regions of the non-sensor regions in contact with the sensor regions.

7. The touch panel of claim 1, wherein the touch panel comprises a first conductive layer positioned on the first substrate in the sensor regions, and a second conductive layer positioned on a surface of the second photo spacers of the second substrate.

8. The touch panel of claim 7, wherein the first conductive layer comprises a plurality of first conductive patterns positioned in the sensor region, and each of the first conductive pattern and its corresponded second conductive layer compose a sensor.

9. The touch panel of claim 8, wherein the touch panel further comprises a plurality of switches positioned on the first substrate, and each of the switch is electrically connected to the sensor, respectively.

10. The touch panel of claim 9, wherein the touch panel comprises at least a signal reading line electrically connected to the switches.

11. The touch panel of claim 9, wherein the signal reading line senses a change of capacitance between the first conductive layer and the second conductive layer.

12. The touch panel of claim 10, wherein the signal reading line is capable of detecting a contact between the first conductive layer and the second conductive layer.

13. The touch panel of claim 7, wherein the second conductive layer is further positioned on a surface of the first photo spacers of the second substrate.

14. The touch panel of claim 7, wherein each of the first conductive layer and the second conductive layer comprises a transparent conductive layer, respectively.

15. A touch liquid crystal display panel, comprising:

a first substrate comprising a plurality of sensor regions and a plurality of non-sensor region, the non-sensor region having a plurality of first regions and a plurality of second regions, the first substrate in the first regions of the non-sensor regions having a first thickness, the first substrate in the sensor regions having a second thickness, the first substrate in the second regions of the non-sensor regions having a third thickness, wherein the first thickness is greater than the second thickness, and the second thickness is greater than the third thickness;

a second substrate disposed facing the first substrate, the second substrate comprising a plurality of first photo spacers, a plurality of second photo spacers and a plurality of third spacers disposed on the second substrate facing the first substrate, the first photo spacers, the second photo spacers and the third photo spacers having substantially the same height, the first photo spacers being structurally connected to the first substrate in the first regions of the non-sensor regions, the second photo spacers being positioned corresponding to the first substrate in the sensor regions to form a first gap between the second photo spacer and the first substrate in the sensor region, the third photo spacers being positioned corresponding to the first substrate in the second region of the non-sensor regions to form a second gap between the third photo spacer and the first substrate in the second region of the non-sensor region, wherein the second gap is larger than the first gap; and a liquid crystal layer disposed between the first substrate and the second substrate.

\* \* \* \* \*